United States Patent
Narad

(10) Patent No.: US 8,117,356 B1
(45) Date of Patent: Feb. 14, 2012

(54) DIRECT MEMORY ACCESS (DMA) TRANSFER OF NETWORK INTERFACE STATISTICS

(75) Inventor: Charles E. Narad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/942,790

(22) Filed: Nov. 9, 2010

(51) Int. Cl.
 *G06F 13/28* (2006.01)
 *G06F 15/173* (2006.01)
 *G06F 15/16* (2006.01)

(52) U.S. Cl. ........... 710/22; 709/223; 709/234; 709/250

(58) Field of Classification Search .................. 710/22; 709/250, 223, 224
See application file for complete search history.

(56) References Cited

U.S. PATENT DOCUMENTS

| | | | |
|---|---|---|---|
| 4,875,206 A | 10/1989 | Nichols et al. | |
| 5,699,350 A | 12/1997 | Kraslavsky | |
| 6,094,439 A | 7/2000 | Krishna et al. | |
| 6,424,629 B1 | 7/2002 | Rubino et al. | |
| 6,434,620 B1 | 8/2002 | Boucher et al. | |
| 6,697,382 B1 | 2/2004 | Eatherton | |
| 2003/0028658 A1 | 2/2003 | Bullman et al. | |
| 2003/0103521 A1 | 6/2003 | Raphaeli et al. | |
| 2003/0210652 A1 | 11/2003 | Chiang et al. | |
| 2004/0027991 A1 | 2/2004 | Jang et al. | |
| 2004/0073849 A1 | 4/2004 | Wong et al. | |
| 2004/0111535 A1 | 6/2004 | Boucher et al. | |
| 2004/0125774 A1 | 7/2004 | Hoyt | |
| 2004/0190685 A1 | 9/2004 | Davies | |
| 2004/0199727 A1 | 10/2004 | Narad | |
| 2004/0203371 A1 | 10/2004 | Loh et al. | |
| 2005/0066060 A1 | 3/2005 | Pinkerton et al. | |
| 2005/0111448 A1 | 5/2005 | Narad | |
| 2005/0114536 A1 | 5/2005 | Narad | |
| 2006/0227712 A1 | 10/2006 | Cheng et al. | |
| 2006/0264207 A1 | 11/2006 | Tamura et al. | |
| 2006/0280174 A1 | 12/2006 | Villefrance | |

OTHER PUBLICATIONS

"Supplemental Final Office Action for U.S. Appl. No. 10/722,747 dated Aug. 31, 2009.", Whole Document.
"Final Office Action for U.S. Appl. No. 10/722,747", (Apr. 9, 2007), Whole Document.
"Final Office Action for U.S. Appl. No. 10/722,747", (Mar. 21, 2008), Whole Document.
"Final Office Action for U.S. Appl. No. 10/722,727", (Feb. 28, 2008), Whole Document.
"Final Office Action for U.S. Appl. No. 10/722,747", (Jul. 2, 2009), Whole Document.
"Notice of Allowance for U.S. Appl. No. 10/722,747", (Jul. 12, 2010), Whole Document.
"Office Action for U.S. Appl. No. 10/722,747", (Jan. 15, 2010), Whole Document.
"Office Action for U.S. Appl. No. 10/722,747", (Oct. 15, 2008), Whole Document.
"Office Action for U.S. Appl. No. 10/722,747", (Oct. 3, 2007), Whole Document.
"Office Action for U.S. Appl. No. 10/722,727", (Aug. 15, 2007), Whole Document.
"Office Action for U.S. Appl. No. 10/722,747", (Sep. 15, 2006), Whole Document.
"OIF, System Packet Interface Level 4 (SPI-4) Phase 2 Revision 1: OC-192 System Interface for Physical and Link Layer Devices, 2003", Whole Document.
Waldbusser, et al., "Introduction to the Remote Monitoring (RMON) Family of MIB Modules; RFC 3577, Network Working Group, pp. 1-31", (Aug. 2003), 1-31.

*Primary Examiner* — Chun-Kuan Lee

(57) ABSTRACT

In general, in one aspect, the disclosure describes a method that includes maintaining statistics, at a network interface, metering operation of the network interface. The statistics are transferred by direct memory access from the network interface to a memory accessed by at least one processor.

6 Claims, 3 Drawing Sheets

DIRECT MEMORY ACCESS (DMA) TRANSFER OF NETWORK INTERFACE STATISTICS

REFERENCE TO RELATED APPLICATIONS

This application relates to U.S. patent application Ser. No. 10/722,727, entitled "GENERATING PACKETS", filed on Nov. 25, 2003 (now abandoned). This application also is a continuation of, and claims priority to, U.S. patent application Ser. No. 10/722,747, filed Nov. 25, 2003, entitled "Direct Memory Access (DMA) Transfer of Network Interface Statistics".

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination. A given packet may travel across many network nodes (e.g., "routers", "bridges" and "switches") before reaching its destination.

FIG. 1 illustrates an example of components forming a network node. As shown, the node includes a network interface that connects a processor system to a network (shown as a cloud). Typically, an intermediate node, such as a router, will include many different network interfaces. As shown, the interface carries packets traveling between the processor system and the network.

Network interfaces often compile statistics on their operation such as the number of packets or bytes received or transmitted. For instance, as shown, the interface updates the statistics for packets received (packet "a") and sent (e.g., packet "b").

DETAILED DESCRIPTION

As described above, in addition to carrying data between a processor system and a network, network interfaces often collect statistics monitoring operation of the interface. For example, such statistics can meter network traffic received or sent by the interface. These statistics can be analyzed by a processor, for example, to monitor performance of the connection. Transferring the statistics for analysis can, however, impose a significant burden on the processor(s). For example, in some systems, the processor(s) may issue a series of requests for statistic values and devote considerable resources to overseeing storage of the values in memory.

Figure 1:
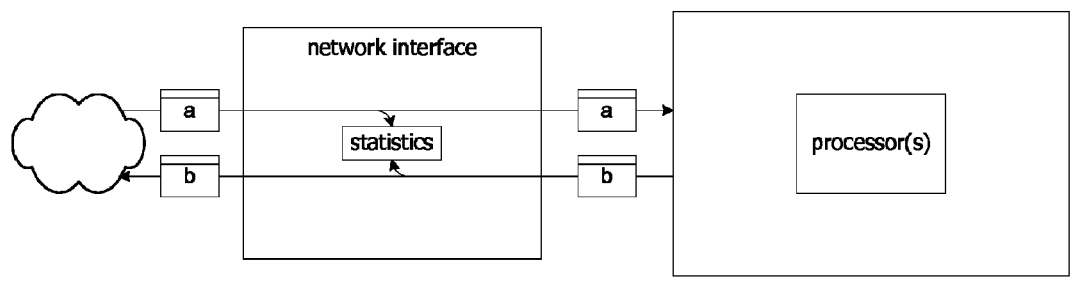
FIG. 1 is a flow-diagram illustrating operation of a network interface.
Figure 2:
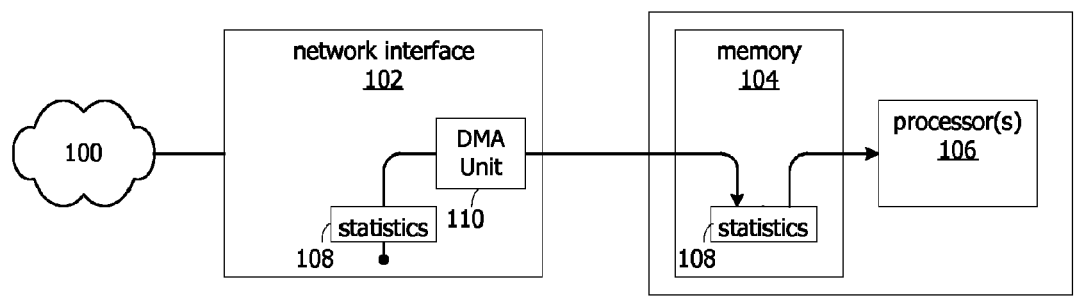
FIG. 2 is a flow-diagram illustrating Direct Memory Access (DMA) transfer of statistics metering operation of a network interface.

FIG. 2 depicts a scheme that uses a technique known as Direct Memory Access (DMA) to transfer statistics 108 to a memory 104 accessed by processor(s) 106. Briefly, Direct Memory Access permits memory access without involvement of a processor. That is, DMA enables an entity to share access to a memory's 104 address and data busses instead of requiring memory operations to pass through the processor(s) 106. This technique can relieve processors(s) 106 of the burden of handling the transfer of each statistic value, freeing the processor(s) for other tasks. To further reduce processor involvement, the statistics transfer can be configured to occur automatically, for example, at periodic intervals or when certain events occur.

In greater detail, FIG. 2 depicts a network interface 102 that collects network interface statistics 108. For example, a standard called RMON (Internet Engineering Task Force, Request for Comments #3577, Introduction to Remote Monitoring (RMON) Family of MIB Modules, Waldbusser, et al., August 2003) specifies a set of counters that include the number of bytes sent and received, number of packets sent and received, "buckets" of packet size ranges, various network congestion and error conditions, and so forth.

As shown, the network interface 102 includes a DMA Unit 110 that transfers statistic values 108 to the memory 104. The DMA Unit 110 circuitry may vary depending on the DMA architecture used. For example, the DMA Unit 110 may act as a memory master over a Peripheral Component Interconnect (PCI) bus. Once transferred, the statistics 108 may be accessed by processor(s) 106. The processor(s) 106 can include a Central Processing Unit (CPU) and/or engine(s) of a network processor that aggregates many such processing engines on a single integrated die.

The interface 102 can be configured to transfer the statistics to a particular location in memory 104. For example, the location may correspond to the location of a data structure mapping a block of the transferred data to different counter values. Potentially, processor(s) 106 may access the data while a DMA transfer is occurring. This may result in some inconsistency in the data accessed. For example, the "packets sent" statistic accessed by the processor(s) 106 may be from a previous DMA transfer while the "packets received" statistic accessed may have just been written by the current DMA transfer. In many cases, this discrepancy is of little importance as many applications using this data assume that individual counter values are not precisely correlated, instead looking for long-term statistical trends.

While usually not a requirement, a variety of techniques can provide statistic consistency for applications. For example, the DMA unit 110 and processor(s) 106 may share a mutex (mutual exclusion) lock that enables only one entity 110, 106 to access the memory 104 locations storing the statistics 108 at a time. Alternately, the DMA unit 110 may change the location used to store the statistics 108, creating a series of "snapshots" of the interface's counter values at different times. The processor(s) 106 can then restrict its access, for example, to the most recently completed snapshot.

The storage of these snapshots can be controlled in a variety of ways. For example, the locations used to store the snapshots may correspond to different elements of a "ring" where, eventually, after completing a circle around the ring, a new snapshot overwrites the oldest. Alternatively, the location of a snapshot may be set to a buffer allocated from a freelist. The buffer may be appended to a linked list after being populated with DMA-ed data. The processor(s) 106 may be restricted from pre-maturely accessing a buffer until the buffer is linked into the list. The data transferred in a snapshot might contain additional information such as a snapshot sequence number or a timestamp indicating the approximate time at which the snapshot was captured.

The transfer destination locations may be pre-configured in the interface 102. Alternately, the processor(s) 106 may issue commands to the interface 102 that specify the location in memory 104 in which to dump all or a specified subset of the statistics.

After transferring the statistics 108 data, the interface 102 may signal completion of the transfer to the processor(s). For example, the interface 102 can generate a processor interrupt signal. Alternatively the interface 102 may indicate in memory 104 that the transfer is complete by indications including flags, ring pointers, linked-list pointers and so forth. The processor(s) 106 might poll or test periodically or at random intervals the locations in memory containing such indications to determine if a transfer has occurred. The processor(s) 106 may instead access the location(s) in memory 104 containing the statistics 108 at a time based on prior knowledge of the time or periodicity of statistics 108 delivery into memory 104 by the interface 102.

After, or even during a transfer, the processor(s) 106 can perform a variety of operations. For example, the processor(s) 106 can determine counter changes ("deltas") since the last transfer. The processor(s) 106 can then use these deltas, for example, to update its master tabulation of counter values (not shown) or to trigger an alarm if a predetermined threshold is reached.

Potentially, the processor(s) 106 may include a cache (not shown). For example, the cache may store statistic values recently accessed by the processor(s) 106. While speeding access to this data for the processor(s) 106, the cache can become outdated. For example, a new set of statistic values 108 may be transferred after previously transferred values were stored in the cache. To prevent cached statistic values from going stale, memory locations storing transferred statistics 108 may be mapped/marked as non-cacheable. Alternately, the cached values may be cleared or updated upon receipt of updating statistic data utilizing a cache coherence mechanism such as write-invalidate or write-update. Potentially, the statistic values 108 may be pushed directly into the processor(s) 106 cache, and either mirrored in memory 104 or only to be written to memory 104 when victimized from the cache.

The network interface 102 may include a variety of hardware and/or software components. For example, the network interface 102 may include a PHY (physical layer device) that performs analog-to-digital conversion on received signals (e.g., wire, optic, or wireless analog signals). The PHY may feed a framer that groups the bits output by the PHY into frame packets, for example, by identifying bits signaling the start and end of a frame packet. The framer may also perform other operations such as bit/character stuffing and unstuffing, checksum computation and verification, packet de/en-capsulation, serialization/deserialization and so forth. The framer operations and packet format depend on the framing technology supported (e.g., Synchronous Optical NETwork (SONET), Ethernet, High-Level Data Link Control (HDLC), and Point-to-Point Protocol (PPP)). The network interface 102 may include other components such as a Transmission Control Protocol (TCP) Offload Engine (TOE) that offloads TCP operations (e.g., ACK generation, segment reassembly, and so forth) from the processor(s) 106.

Figure 3:
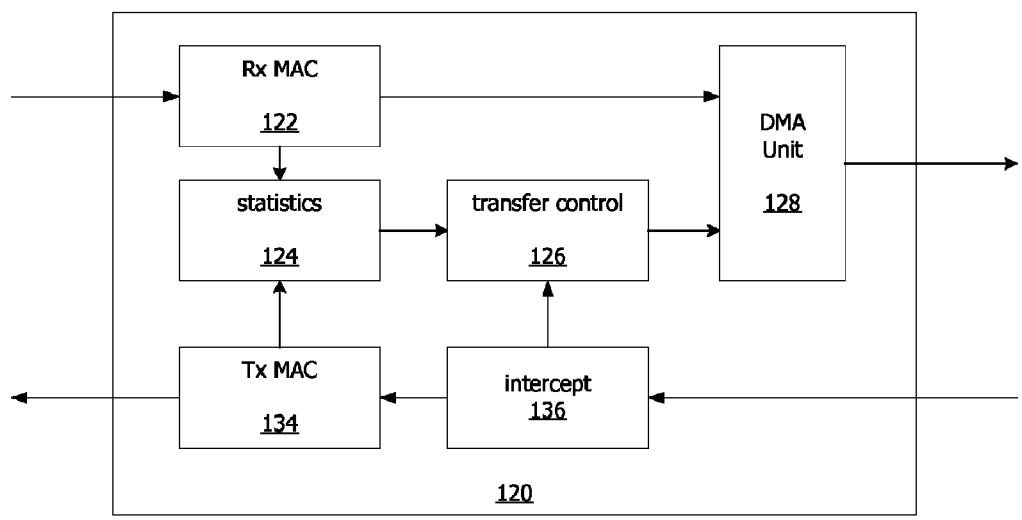
FIG. 3 is a diagram of a Media Access Controller (MAC).

FIG. 3 depicts an example of an Ethernet Media Access Controller (MAC) 120 framer that may be found in a network interface 102 using DMA to transfer statistic values. As shown, the framer 120 includes circuitry to perform receive (Rx) 122 and transmit (Tx) 134 framing operations on in-bound and out-bound data, respectively. Both sets of circuitry 122, 134 can update statistic values 124 being monitored. As shown, the framer 120 also includes a DMA unit 128 that can transfer received packets to memory as requested by the Rx 122 circuitry. The DMA unit 128 is also operationally coupled to transfer control circuitry 126 to initiate DMA transfer of statistic values 124.

Operations performed by the transfer control circuitry 126 can be configured in a variety of ways. For example, the circuitry 126 may be configured to select some subset of monitored statistic values to transfer. Similarly, the circuitry 126 may be configured to automatically transfer some or all statistic values 124 at particular intervals or when particular values reach pre-configured thresholds. Potentially, these configuration options may be combined to specify transfer of different sets of statistics at different times (e.g., transfer "send" statistics at time interval "1" and "receive" statistics at time interval "2").

The framer 120 may also be configured to select a particular mechanism used to maintain counter values 124. Briefly, a counter is much like a car's odometer—when the counter reaches its maximum value, it rolls-over back to zero. The interface 102 may be configured to let the counter's "free run". Alternately, the interface 102 may be configured to zero the counters after the statistics 108 are transferred to memory 104. Such counters would reflect a change since the last statistics transfer. To prevent ambiguity in the data, the framer can be configured to transfer statistics 108 at a frequency great enough to prevent counter wrap-around.

As shown, the interface framer 120 can be configured using a variety of mechanisms. For example, the framer can be configured by different registers (not shown) that the processor(s) can access. For instance, a "1" stored in bit-1 of a register may select the "packets sent" statistic for transfer while other register bits identify a time interval for transferring the statistic. Alternately, the framer 120 may include circuitry 136 to intercept packets, for example, traveling along the interface's 120 transmit path (e.g., the path leading to the network) or receive path (e.g., the path leading to the processor(s) 106). For instance, the processor(s) 106, or other entity, may construct a packet having characteristics identifying the packet as one carrying data to configure the interface 120 instead of one to be transmitted over the network. As an example, such a packet may include a source and destination address having some preset value(s). The payload of such packets may include data identifying, for example, statistics to transfer, intervals or specific times to transfer data, a command for an immediate transfer, a schedule of differing transfers, and/or threshold statistic values of events that trigger a transfer. The payload may further include data identifying the location(s) in memory 104 in which to place statistics. The intercept circuitry 136 may use this packet data to program operation of the transfer control circuitry 126. For example, the intercept 136 circuitry may use this data to program a timer (not shown) that initiates transfer. The mechanisms (e.g., registers or packets) used to configure the framer may also be used to make a "one-shot" transfer request.

The preceding description frequently used the term "packet" to refer to a frame. However, the term packet also describes Transmission Control Protocol (TCP) segments, Internet Protocol (IP) datagrams, Asynchronous Transfer Mode (ATM) cells, and so forth.

The term circuitry as used herein includes hardwired circuitry, digital circuitry, analog circuitry, programmable circuitry, and so forth. The programmable circuitry may operate on computer programs. For example, the transfer control 126 and intercept 136 circuitry may be implemented by a microcontroller programmed to perform operations described above. Such programs may be coded in a high level procedural or object oriented programming language. However, the program(s) can be implemented in assembly or machine language if desired. The language may be compiled or interpreted.

Techniques described above may be used in a wide variety of networking environments. Further, techniques described above may be incorporated into a variety of components such as a Network Interface Controller (NIC) chip and/or card or included in a motherboard chipset or network processing unit (NPU). These techniques may also be implemented in a router or switch line card.

Other embodiments are within the scope of the following claims.

What is claimed is:

1. A network interface controller, comprising:
   at least one interface to a physical layer device (PHY);
   at least one Ethernet media access controller (MAC) communicatively coupled to the at least one interface to the PHY;
   at least one peripheral component interconnect interface;
   at least one direct memory access (DMA) controller to transfer data, including packets received via the at least one interface to the PHY and the at least one MAC, to a host via the at least one peripheral component interconnect interface;
   at least one host accessible register to store configuration settings to be received from the host, the configuration settings comprising:
      a host programmable timer value specifying a recurring timer interval to transfer operation statistics of the network interface controller by DMA to memory of the host;
      a location in the memory of the host to transfer the operation statistics to;
      at least one indication of a one-shot, non-recurring, transfer of the operation statistics;
      at least one indication of a selection of the operation statistics; and circuitry configured to, when in operation:
         in response to the host storing the configuration settings for a one-shot request in the at least one register, perform a non-recurring, one time DMA transfer of the operation statistics to the memory of the host via the peripheral component interconnect interface; and
         in response to the host storing the configuration settings for the recurring timer interval, repeatedly causing transfer of the operation statistics of the network interface controller by DMA to the memory of the host based on periodicity specified by the host programmable timer value.

2. The network interface controller of claim 1, wherein the DMA controller is configured to transfer the operation statistics as a contiguous block of data.

3. The network interface controller of claim 1,
   wherein the operation statistics include a number of bytes transmitted by the network interface controller, a number of bytes received by the network interface controller, a number of packets transmitted by the network interface controller, a number of packets received by the network interface controller, a count of packets in buckets associated with different packet sizes, and at least one error condition.

4. A system, comprising:
   at least one processor;
   a memory;
   at least one peripheral component interconnect bus; and
   at least one network interface controller, the network interface controller comprising:
      at least one interface to a physical layer device (PHY);
      at least one Ethernet media access controller (MAC) communicatively coupled to the at least one interface to the PHY;
      at least one peripheral component interconnect interface coupled to the at least one peripheral component interconnect bus;
      at least one direct memory access (DMA) controller to transfer data, including packets received via the at least one interface to the PHY and the at least one MAC, to via the at least one peripheral component interconnect interface;
      at least one host accessible register to store configuration settings to be received from the host, the configuration settings comprising:
         a host programmable timer value specifying a recurring timer interval to transfer operation statistics of the network interface controller by DMA to memory of the host;
         a location in the memory of the host to transfer the operation statistics to;
         at least one indication of a one-shot, non-recurring, transfer of the operation statistics;
         at least one indication of a selection of the operation statistics; and circuitry configured to, when in operation:
            in response to the host storing the configuration settings for a one-shot request in the at least one register, perform a non-recurring, one time DMA transfer of the operation statistics to the memory of the host via the peripheral component interconnect interface; and
            in response to the host storing the configuration settings for the recurring timer interval, repeatedly causing transfer of the operation statistics of the network interface controller by DMA to the memory of the host based on periodicity specified by the host programmable timer value.

5. The system of claim 4, wherein the DMA controller is configured to transfer the operation statistics as a contiguous block of data.

6. The system claim 4,
   wherein the operation statistics include a number of bytes transmitted by the network interface controller, a number of bytes received by the network interface controller, a number of packets transmitted by the network interface controller, a number of packets received by the network interface controller, a count of packets in buckets associated with different packet sizes, and at least one error condition.

* * * * *